UNITED STATES PATENT OFFICE.

LEOPOLD HOFF, OF HAMBURG, GERMANY.

TREATMENT OF BEER.

SPECIFICATION forming part of Letters Patent No. 470,621, dated March 8, 1892.

Application filed April 7, 1891. Serial No. 388,016. (No specimens.)

*To all whom it may concern:*

Be it known that I, LEOPOLD HOFF, a subject of the Emperor of Germany, and a resident of the city of Hamburg, Germany, have invented certain new and useful Improvements in the Manipulation of Beer, of which the following is a specification.

Heretofore it has been customary in pasteurizing beer for the purpose of adapting it to be shipped to tropical countries to concentrate or thicken it by boiling it and then to add a quantity of alcohol equal to the alcohol lost by concentrating it, and also to add or force it into carbonic acid equal to the amount driven off by concentrating it. The property of this concentrated beer of remaining wholesome is obtained by destroying all fermenting-germs and microbe organisms in boiling it. Such beer before being used for drinking was mixed with water and fermenting-germs and alcohol were added.

The object of my invention is to provide beer treated in this manner so as to be adapted for use as a beverage and nourishing-fluid on account of the absence of alcohol and fermenting-germs or to use it as the mother-liquid for an entirely new sort of beverage.

In the process of concentrating the beer heretofore it was not only boiled, but a certain quantity of water was driven off, and this water cannot be replaced later on without materially deteriorating the beer, for the reason that this concentrated beer will not fully mix or dissolve with water later on, and the water expelled by boiling not only has carried off the alcohol, but the aroma or the volatile parts.

In carrying out my invention I boil the beer in a still under the highest possible column of a rectifying apparatus, such as is used in refining spirits. The first condensation-vessels of the apparatus behind the column are connected for this purpose with the still in such a manner that all the water that is evaporated and condensed flows back into the beer. The beer thus treated, besides having been deprived of its alcohol and the sterilizing of the fermenting-germs, has also been subjected to other changes. The albuminoids contained in the beer have become coagulated by the heat and thus rendered insoluble and make the liquid turbid. The liquid is then to be cooled, and for this reason the still is connected with a suitable column and beer-filtering apparatus. The coagulation of the albuminoids might be prevented by less pressure in the distilling apparatus and the temperature not raised as high as the ordinary boiling temperature. The distilling apparatus would then be converted into a kind of vacuum-pan. While the liquid is passing through the cooler and filter it must be carefully kept from contact with the air, and it is then conducted into a closed vessel, in which the carbonic-acid gas is forced into it.

This apparatus is preferably constructed like the mixing device of a soda-water apparatus, so as to facilitate forcing carbonic-acid gas into the beer and also add different bodies and fluids and to facilitate filling the liquid without foam into bottle, carboys, or barrels. Before or while forcing the carbonic acid into the liquid a certain quantity of water is forced into it, which water must be carefully sterilized before being forced into the beer. Besides having been deprived of the alcohol, fermenting-germs, and fusel-oils the beer has also been deprived to a certain extent of its specific taste and smell. The said taste and smell in the beer are caused by certain bodies that are more volatile than alcohol, and thus have been forced out with alcohol in the rectifying apparatus. Of the from one to five per cent. high-grade alcohol, according to the quantity of the same in the beer, first driven off by the distillation process and condensed the first one-third is submitted to a separate and fractional distillation, and the mixture of volatile substances obtained by this fractional distillation is mixed with the boiled beer and gives the same the original taste and smell. If this substance is not sufficient to give the beer the proper taste and smell, an extract can be made from malt and hops, which can be applied to the beer for the above purpose. The liquid while still in the apparatus for charging it with carbonic-acid gas can be mixed with one-third or even with two-thirds of its quantity with sterilized water, and aromatic substances can be added—for instance, such as harmless bitter substances, fruit-sirups, and other substances—to change the taste of the liquid. Pure alcohol or fluids containing the same in a refined state—for example, cognac—may be added.

In order to be absolutely sure that all micro organisms, &c., that may possibly be contained in this mixture are destroyed, the liquid can be pasteurized in the usual manner. By thus pasteurizing the liquid the same will not remain turbid, as all substances that are rendered insoluble by heat have been removed. If the liquid is not pasteurized, a nourishing substance can be incorporated in the same. The vegetable albuminous bodies and carbohydrates contained in the germs, which after drying the malt become separated from the malt, are dissolved in water and are mixed with the fluid, care being taken to pass this solution through a microbe-membrane filter. The liquid obtained can be preserved longer than any pasteurized beer and has great advantages over the latter. For example, the bad-smelling gases that are generated in bottles and remain in the same by the pasteurization process are not found in my improved liquid.

Having thus described my invention, I claim as new and desire to secure by Letters Patent—

The method of treating beer, consisting, first, in distilling the beer; secondly, conducting the condensed water back into the boiling liquid; thirdly, cooling and filtering the liquid; fourthly, forcing carbonic acid-gas into the liquid, and, finally, adding aromatic substances giving the special character to the beer, substantially as set forth.

In testimony that I claim the foregoing as my invention I have signed my name in presence of two subscribing witnesses.

LEOPOLD HOFF.

Witnesses:
ULRICH R. MAERZ,
FELIX SCHULZE.